(12) United States Patent
Wanstrom et al.

(10) Patent No.: US 11,787,719 B2
(45) Date of Patent: *Oct. 17, 2023

(54) STRUVITE RECOVERY AND PHOSPHORUS MANAGEMENT TECHNIQUES FOR WASTEWATER TREATMENT PLANTS

(71) Applicant: Schwing Bioset, Inc., Somerset, WI (US)

(72) Inventors: Charles M. Wanstrom, Maplewood, MN (US); Thomas M. Anderson, Naples, FL (US); Wim H. M. Moerman, Deerlijk (BE)

(73) Assignee: Schwing Bioset, Inc., Somerset, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,764

(22) Filed: Sep. 12, 2022

(65) Prior Publication Data

US 2023/0002265 A1 Jan. 5, 2023

Related U.S. Application Data

(63) Continuation of application No. 16/157,366, filed on Oct. 11, 2018, now Pat. No. 11,440,825.

(60) Provisional application No. 62/570,800, filed on Oct. 11, 2017.

(51) Int. Cl.
| | | |
|---|---|---|
| *C02F 9/00* | (2023.01) | |
| *C02F 3/28* | (2023.01) | |
| *C02F 101/10* | (2006.01) | |
| *C02F 11/04* | (2006.01) | |

(Continued)

(52) U.S. Cl.
CPC .......... *C02F 9/00* (2013.01); *C02F 1/66* (2013.01); *C02F 3/286* (2013.01); *C02F 11/04* (2013.01); *C02F 11/12* (2013.01); *C02F 2101/105* (2013.01); *C02F 2301/106* (2013.01)

(58) Field of Classification Search
None
See application file for complete search history.

(56) References Cited

U.S. PATENT DOCUMENTS

| | | |
|---|---|---|
| 6,387,264 B1 | 5/2002 | Baur |
| 7,182,872 B2 | 2/2007 | Barak et al. |
| 7,609,740 B2 | 10/2009 | Glueck |

(Continued)

OTHER PUBLICATIONS

Roberts, Two Stage, Thermophilic-Mesophilic Anaerobic Digestion of Sewage Sludge, 1999, Institution of Chemical Engineers, vol. 77, Part B (Year: 1999).

(Continued)

*Primary Examiner* — Bradley R Spies
*Assistant Examiner* — Jeannie McDermott
(74) *Attorney, Agent, or Firm* — Kinney & Lange, P.A

(57) ABSTRACT

A waste treatment process utilizes a two-stage digestion process with a thermophilic digester, a heat exchanger, and a mesophilic digester. The pH of the thermophilic digestate is increased by removal of carbon dioxide with an air stripper, or by adding a pH increasing reagent upstream of the heat exchanger. The pH adjustment of the digestate protects the heat exchanger and downstream equipment and processes from struvite formation. A struvite reactor may be located in various locations downstream of the heat exchanger to produce a treated digestate or effluent that contains struvite, which can optionally be recovered for beneficial use.

20 Claims, 8 Drawing Sheets

(51) Int. Cl.
*C02F 11/12* (2019.01)
*C02F 1/66* (2023.01)

(56) References Cited

U.S. PATENT DOCUMENTS

| | | |
|---|---|---|
| 2001/0045390 A1 | 11/2001 | Kim et al. |
| 2004/0011718 A1 | 1/2004 | Arnett et al. |
| 2007/0209998 A1 | 9/2007 | Abu-Orf |
| 2010/0282674 A1 | 11/2010 | Barak |
| 2012/0122196 A1 | 5/2012 | Johnson |
| 2013/0213883 A1 | 8/2013 | Josse et al. |
| 2014/0346108 A1 | 11/2014 | Josse et al. |
| 2015/0308001 A1 | 10/2015 | Barak |
| 2016/0017444 A1 | 1/2016 | Medoff et al. |
| 2016/0130158 A1 | 5/2016 | Theodoulou et al. |
| 2018/0370830 A1 | 12/2018 | Fitch et al. |
| 2019/0144320 A1 | 5/2019 | Nilsen et al. |

OTHER PUBLICATIONS

Mooers Products, Bubble Diffuser Differences, 2016, Webpage, scraped from Wayback Machine, dated Sep. 2016 (Year: 2016).

Jardin et al., "Waste activated sludge production of the enhanced biological phosphorus removal process," Water Environment Research; May/Jun. 1997; 69, 3; Agricultural & Environmental Science Database, pp. 375-381.

Liao et al., "Release of phosphorus from biological nutrient removal sludges: A study of sludge pretreatment methods to optimize phosphorus release for subsequent recovery purposes," Journal of Environmental Engineering and Science; Sep. 2003; 2, 5; Agricultural & Environmental Science Database, pp. 369-381.

Williams, "Struvite Precipitation in the Sludge Stream at Slough Wastewater Treatment Plant and Opportunities for Phosphorus Recovery," Environmental Technology, 20:7, 743-747, DOI: 10.1080/09593332008616869, May 2010.

Britton et al., "Pilot-scale struvite recovery from anaerobic digester supernatant at an enhanced biological phosophorus removal wastewater treatment plant," Journal of Environmental Engineering and Science; Jul. 2005; 4, 4; Agricultural & Environmental Science Database, pp. 265-277.

Pubchem, "Compound Summary for CID 178727," https://pubchem.ncbi.nlm.nih.gov/compound/178727#section=Top, accessed Sep. 2020.

Cullen et al., "Three years of operation of North America's first nutrient recovery facility," Water Science & Technology; 2013; 68.4, pp. 763-768.

Doyle et al., "Struvite formation, control and recovery," Water Research; 2002, pp. 3925-3940.

Jaffer et al., "Potential phosphorus recovery by struvite formation," Water Research; 2001, pp. 1834-1842.

Minnesota Pollution Control Agency, "Phosphorus Treatment and Removal Technologies," Jun. 2006, pp. 1-5.

Pastor et al., "Sewage sludge management for phosphorus recovery as struvite in EBPR wastewater treatment plants," Bioresource Technology, vol. 99, Issue 11, Jul. 2008, pp. 4817-4824.

Simpkins, Dulcey, "Anaerobic Digester FAQs," Michigan Biomass Energy Program, Sep. 2005, 3 pages.

Bhuiyan, M. H. et al. "Phosphorus recovery from wastewater through struvite formation in fluidized bed reactors: a sustainable approach." Water science and technology : a journal of the International Association on Water Pollution Research 57 2 (2008): 175-81.

Le Corre et al., "Phosphorus Recovery from Wastewater by Struvite Crystallisation: A Review," Critical Reviews in Enviornmental Science and Technology, vol. 39, Issue 6, 2009, pp. 433-477.

Cecchi et al., "Phospate Cristallisation Process for P Recovery Applied At Treviso Municipal Wastewater Treatment Plant [Italy]," Universita Degli Studi Di Verona, Dipartimento Scientifico E Technologico, 2003, 64 pages.

Altinbas et al., "Struvite precipitation from anaerobically treated municipal and landfill wastewaters," Water Science and Technology, vol. 46, No. 9, 2002, pp. 271-278.

Doyle et al., "Analysis of Struvite Precipitation in Real and Synthetic Liquors," Insitution of Chemical Engineers, Trans IChemE, vol. 78, Part B, Nov. 2000, pp. 480-488.

Neethling et al., "Struvite control through process and facility design as well as operation strategy," Water Science and Technology, vol. 49, No. 2, 2004, pp. 191-199.

and plate heat exchangers. The increase in pH causes struvite to scale on the walls of heat exchanger 14 and inhibit its performance and ability to return heat to the inbound WAS liquid stream.

STRUVITE RECOVERY AND PHOSPHORUS MANAGEMENT TECHNIQUES FOR WASTEWATER TREATMENT PLANTS

REFERENCE TO RELATED APPLICATION

This application is a continuation of U.S. patent application Ser. No. 16/157,366 filed Oct. 11, 2018 for "STRUVITE RECOVERY AND PHOSPHORUS MANAGEMENT TECHNIQUES FOR WASTEWATER TREATMENT PLANTS," which claims benefit to Provisional Application 62/570,800 filed Oct. 11, 2017. The aforementioned U.S. application Ser. No. 16/157,366 and U.S. Provisional Application No. 62/570,800 are hereby incorporated by reference in their entirety.

BACKGROUND

This disclosure relates to wastewater treatment. In particular, it relates to a wastewater plant that utilizes a two-stage digestion process.

A wastewater plant with two stage digestion can include, for example, a thermophilic digester followed by a heat exchanger and a mesophilic digester. In this system, struvite typically forms in the heat exchanger and mesophilic digester as well as other equipment downstream of the digesters where ammonia, phosphorus, and magnesium are present. A critical location is the heat exchanger between the thermophilic and mesophilic digesters. Struvite precipitates in this heat exchanger that is heating the inbound sludge and cooling the outbound thermophilic digestate. The struvite precipitation can render the heat exchanger ineffective, and accumulate in the mesophilic digester requiring periodic dredging foul pipelines, valves, pumps and other equipment creating operational issues and causing additional maintenance expenses.

SUMMARY

In one example, a waste treatment process includes processing waste activated sludge in a thermophilic digester to produce a thermophilic digestate. The waste treatment process further includes increasing pH of the thermophilic digestate, cooling the thermophilic digestate, and processing the cooled thermophilic digestate in a mesophilic digester to produce a mesophilic digestate. The waste treatment process further includes producing, with a struvite reactor, a treated digestate containing struvite, and separating struvite from the treated digestate.

In another example, a waste treatment process includes processing waste activated sludge (WAS) in a thermophilic digester to produce a thermophilic digestate. The waste treatment process further includes increasing pH of the thermophilic digestate, cooling the thermophilic digestate, and producing a treated digestate containing struvite with a struvite reactor. The waste treatment process further includes separating struvite from the treated digestate, processing the treated digestate in a mesophilic digester to produce a mesophilic digestate, and dewatering the mesophilic digestate to produce effluent and solids.

In another example, a waste treatment system includes a thermophilic digester, an air stripper, a heat exchanger, a mesophilic digester, and a struvite reactor. The thermophilic digester produces a thermophilic digestate from waste active sludge. The air stripper removes carbon dioxide from the thermophilic digestate. The heat exchanger cools the thermophilic digestate. The mesophilic digester produces a mesophilic digestate from cooled thermophilic digestate. The struvite reactor produces a treated digestate containing struvite from the mesophilic digestate. The waste treatment system further includes means for separating struvite from the treated digestate.

DETAILED DESCRIPTION

Figure 1:
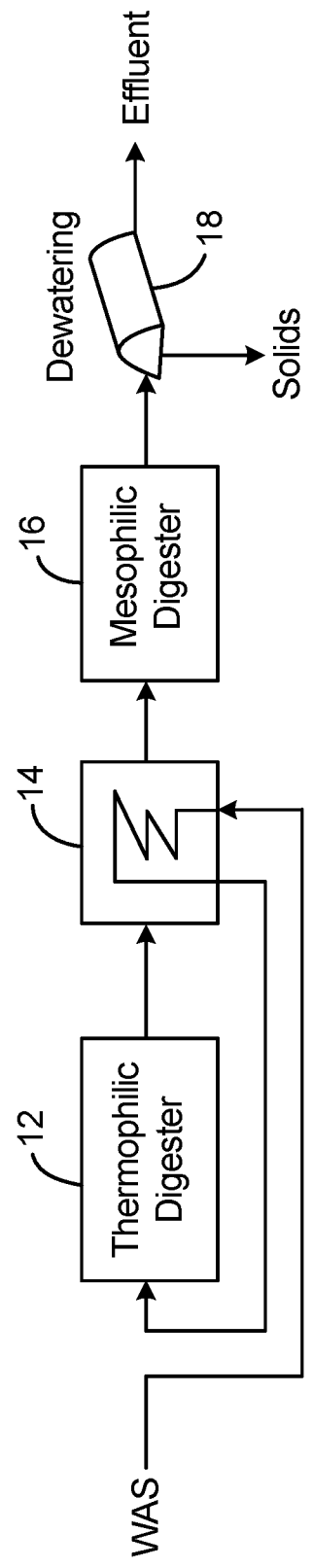
FIG. 1 is a schematic block diagram of a prior art wastewater treatment system.

FIG. 1 shows prior art wastewater treatment plant 10, which includes thermophilic digester 12, heat exchanger 14, mesophilic digester 16, and dewatering apparatus 18. Waste Activated Sludge (WAS), which may or may not be thickened, flows through heat exchanger 14 to thermophilic digester 12, which operates at, for example, approximately 55 degrees Celsius (C). Thermophilic digestate from thermophilic digester 12 passes through heat exchanger 14 so that cooled thermophilic digestate is fed into the mesophilic digester 16, which operates, for example, at approximately 30 degrees C. The cooling medium for heat exchanger 14 is the WAS that is inbound to thermophilic digester 12, so that as much heat as possible is recovered and the operating expense of heating thermophilic digest 12 is reduced. The mesophilic digestate from mesophilic digester 16 is supplied to dewatering apparatus 18, which may be a centrifuge, a screw press, a filter or other device for separating liquid and solids. The liquid fraction (effluent) is sent back to the headworks (HW) or other location of plant 10, while the dewatered bio-solids are generally incinerated, land-filled, or land applied for beneficial use.

Struvite scaling issues arise when the thermophilic digestate enters heat exchanger 14. Popular belief is that this is a result of the cooling of the liquid stream and the related decrease in solubility of struvite at mesophilic temperatures. While this plays a role in struvite scaling, another mechanism for struvite scaling is the resulting increase in pH that is caused by turbulent flow through traditional shell and tube and plate heat exchangers. The increase in pH causes struvite to scale on the walls of heat exchanger 14 and inhibit its performance and ability to return heat to the inbound WAS liquid stream.

Figure 2A:
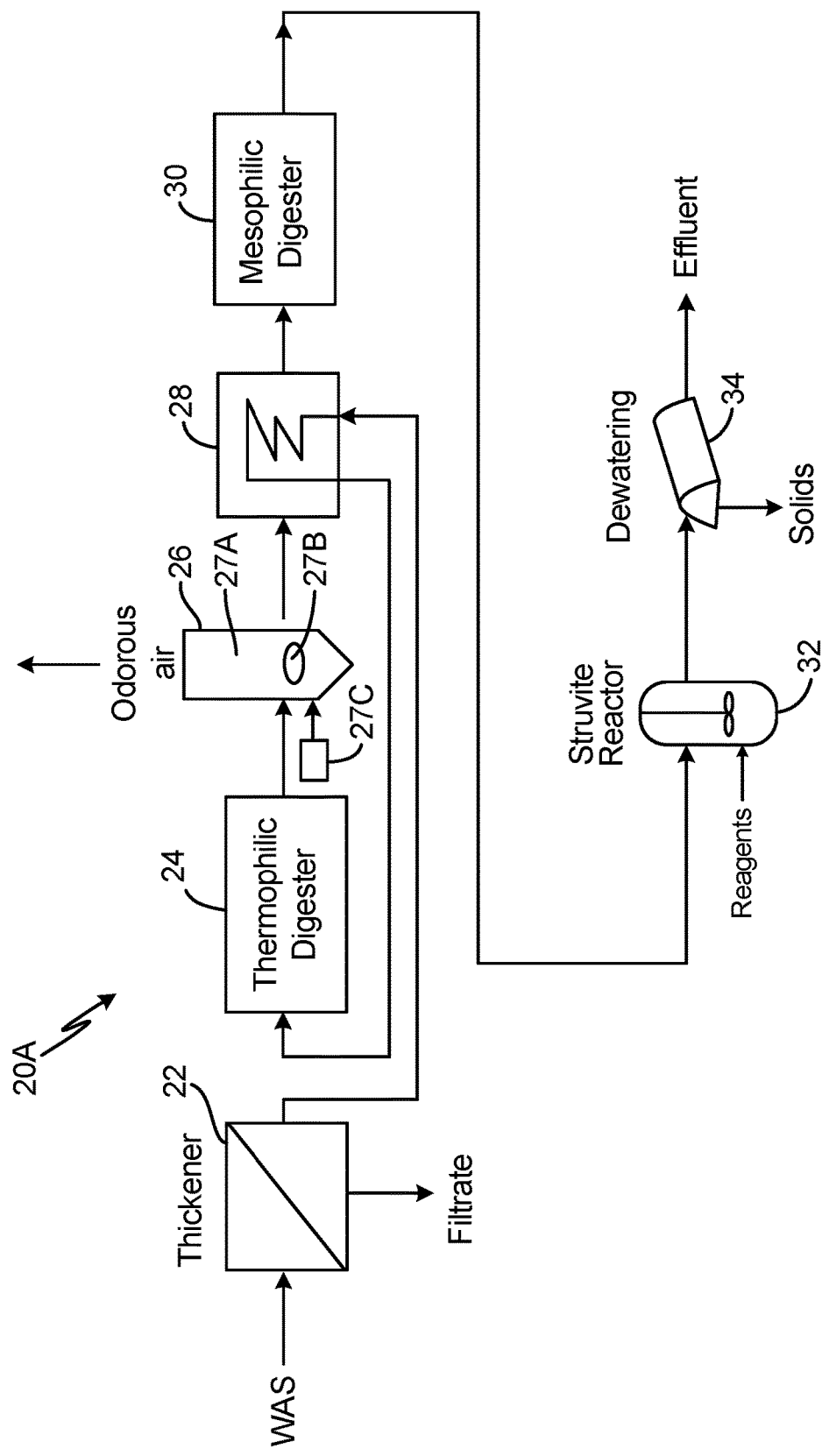
FIGS. 2A and 2B are schematic block diagrams illustrating first and second embodiments, respectively, of a wastewater treatment plant with struvite recovery.

FIG. 2A is a schematic block diagram of wastewater treatment plant 20A, which includes thickener device 22, thermophilic digester 24, air stripper 26 (which includes outer chamber 27A, coarse bubble air diffuser 27B, and air pump or blower 27C), heat exchanger 28, mesophilic digester 30, struvite reactor 32, and dewatering apparatus 34. WAS is supplied to thickener device 22, which separates thickened WAS and filtrate. Thickened WAS is fed to heat exchanger 28, and filtrate is returned to the plant 20A. The thickened WAS flows from heat exchanger 28 to thermophilic digester 24.

Air stripper (or CO2 release tank) 26 is connected downstream from thermophilic digester 24 and upstream from heat exchanger 28. Air stripper 26 is aerated by air provided by pump 27D to coarse bubble air diffuser 27C. The aeration removes carbon dioxide (CO2), from the thermophilic digestate. The carbon dioxide exits the upper end of air stripper 26. The removal of carbon dioxide raises the pH of the thermophilic digestate. This allows struvite to form in a controlled environment until the available magnesium (Mg), which is typically the limiting element in the formation of struvite in this process, is exhausted or reaches a new equilibrium at much lower concentrations. The balance of the downstream equipment is thereby protected from rapid struvite scaling.

The reduced carbon dioxide thermophilic digestate flows from air stripper 26 through heat exchanger 28 to mesophilic digester 30. The flow of thickened WAS through heat exchanger 28 cools the thermophilic digestate before it enters mesophilic digester 30. Struvite reactor 32 can be installed either between the mesophilic digester and the dewatering apparatus 34 or after dewatering apparatus 34 to solve specific plant issues related to dewatering issues, struvite harvesting, sequestration, or return phosphorus loads to the headworks of the plant.

In the embodiment shown in FIG. 2A, struvite reactor 32 is located between mesophilic reactor 30 and dewatering apparatus 34. Mesophilic digestate is fed to struvite reactor 32, which is a continuously stirred tank reactor (CSTR). A reagent (or reagents) is also supplied to reactor 32. While the common reagent used in struvite precipitation is magnesium chloride (MgCl2), depending on the specific process conditions, these reagents could also include sodium hydroxide (NaOH) for additional pH and buffering control or magnesium hydroxide (Mg(OH)2) for the additional Mg source and buffering capacity to accommodate, for example, a deammonification process downstream of this phosphorus/struvite technology. Other reagents are possible and preferred depending on the specific conditions within the process.

The treated digestate from reactor 32 is fed to dewatering apparatus 34, which separates effluent from the bio-solids that are now enriched with struvite. The effluent is returned to the headworks or another location in plant 20A.

Figure 2B:
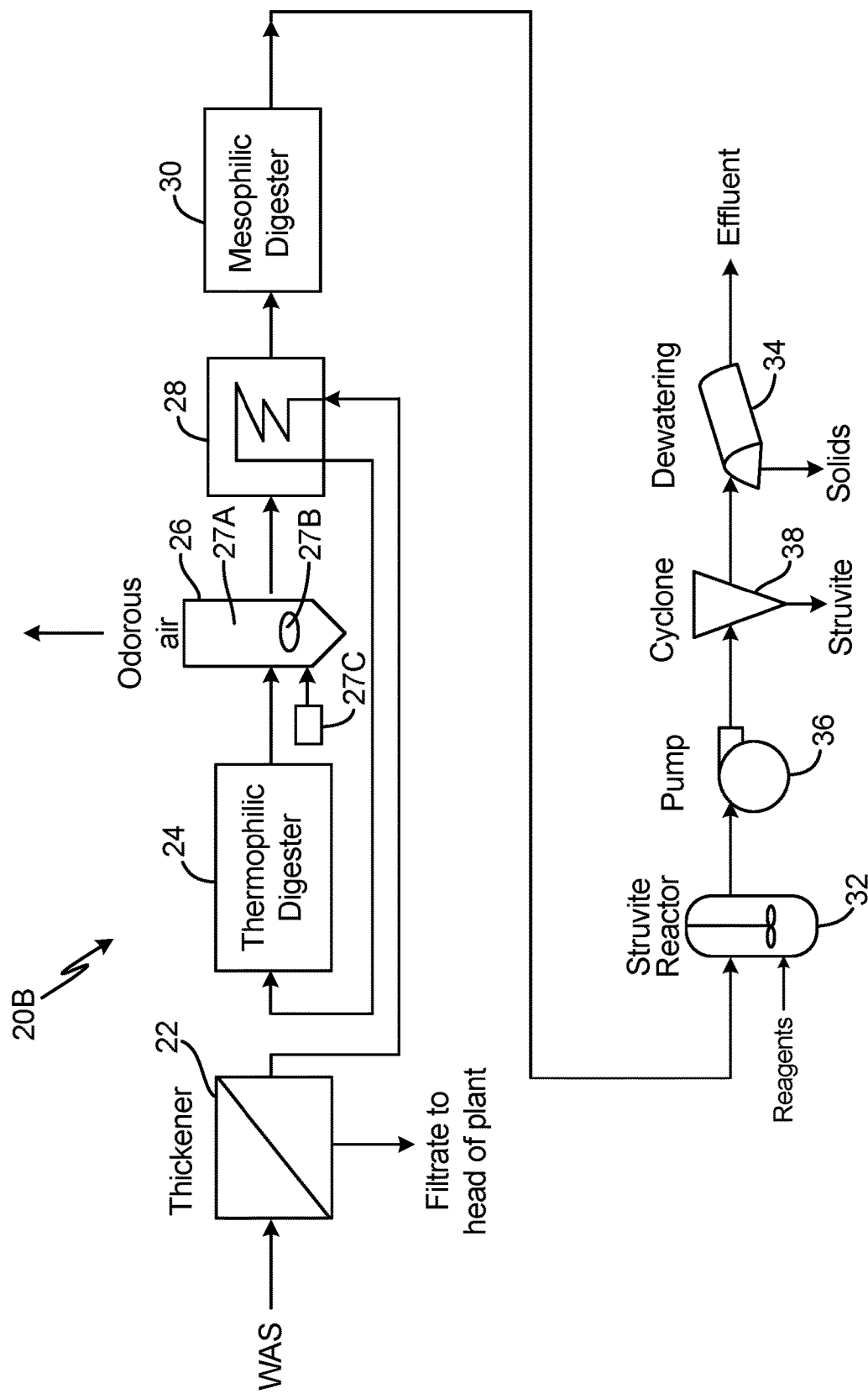

FIG. 2B shows a schematic block diagram of waste treatment plant 20B, which is similar to plant 20A shown in FIG. 2A, except for the addition of pump 36 and cyclone separator 38. Similar reference numerals are used in FIG. 2B to designate similar components.

In plant 20B, pump 36 and cyclone separator 38 are located downstream from struvite reactor 32 and upstream from dewatering apparatus 34. Pump 36 supplies cyclone separator 38 with treated digestate from struvite reactor 32. Cyclone separator 38 separates about 50% of the struvite from the biosolids and water in the treated digestate based on pressure drop across the cyclone and the differences in specific gravity of the medium. This recovered struvite can then be used for beneficial use with alternate disposition than the biosolids. The remaining treated digestate is fed to dewatering apparatus 34. Dewatering apparatus 34 separates effluent from biosolids and the remaining struvite.

Figure 3:
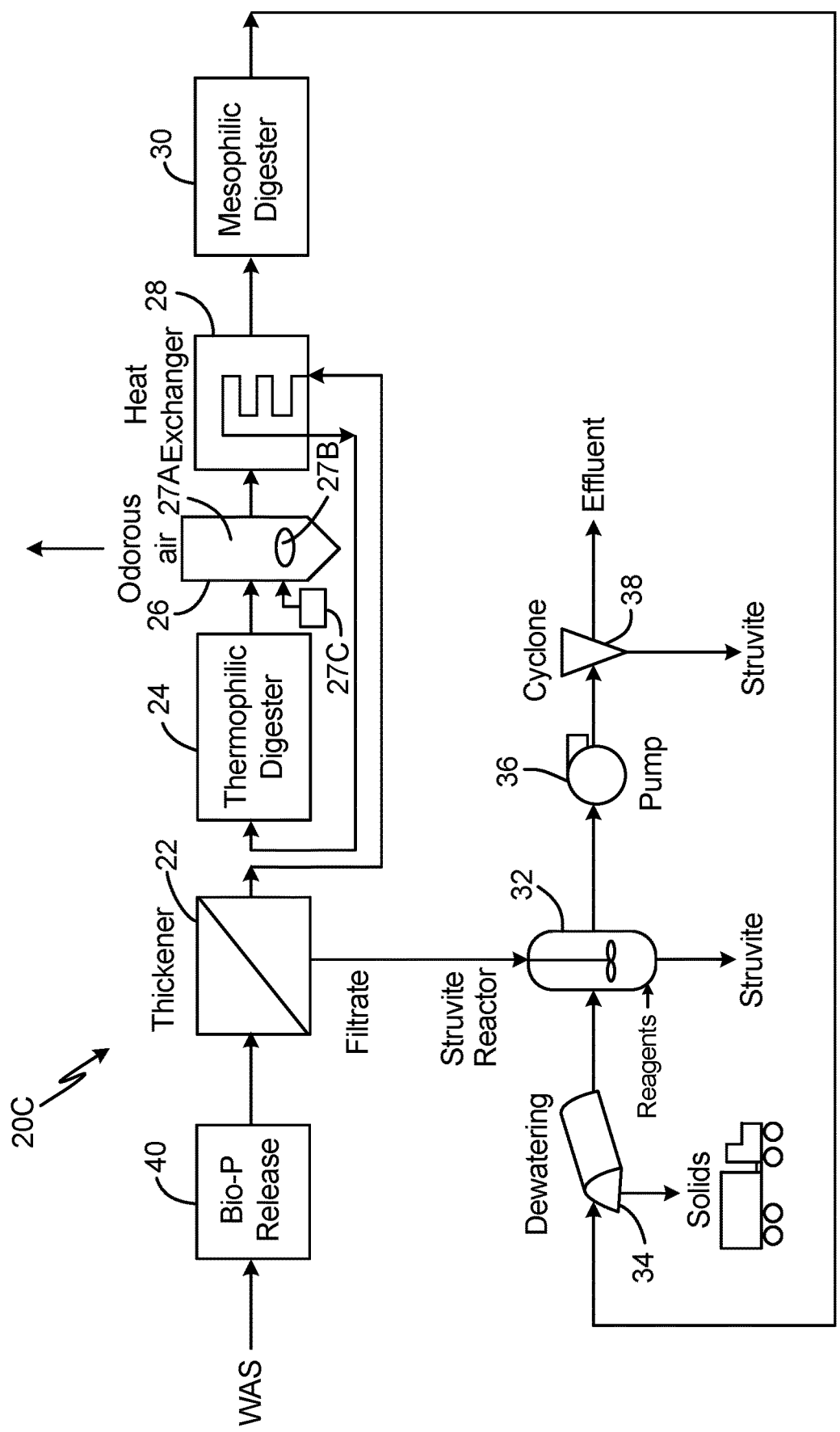
FIG. 3 is a schematic block diagram illustrating a third embodiment.

FIG. 3 shows a schematic diagram of wastewater treatment plant 20C, which includes thickener device 22, thermophilic digester 24, air stripper 26 (which includes chamber 27A, coarse bubble air diffuser 27B, and air pump 27C), heat exchanger 28, mesophilic digester 30, struvite reactor 32, dewatering apparatus 34, pump 36, cyclone separator, 38, and holding tank 40.

Holding tank 40 receives the WAS and provides biological release of phosphorus (bio-P) from the WAS in holding tank 40. The residence time of the WAS in holding tank 40 is a few hours with the addition of volatile fatty acids (VFAs). Alternatively, the residence time is longer without the addition of VFAs to holding tank 40. Magnesium is also released, as well as phosphorus in this bio-P process.

Once the aged WAS exits holding tank 40, it is dewatered by thickening device 22. The phosphorus and magnesium rich filtrate from thickening device 22 is sent to struvite reactor 32. This bypasses the rest of the process stream to also protect thermophilic digester 24 from struvite scaling and sedimentation issues. In this case, struvite reactor 32 is located downstream of dewatering apparatus 34 to avoid dilution of the stream from mesophilic digester 30 prior to dewatering. The liquid fraction (mesophilic effluent) from dewatering apparatus 34 is then combined with the filtrate from thickener device 22. Because solids have been removed by dewatering device 34, struvite settles to the bottom of struvite reactor 32 and can be collected from reactor 32. Treated effluent from reactor 32 is supplied by pump 36 to cyclone separator 38. Fine struvite crystals remaining in the treated effluent are separated by cyclone separator 38, and the treated effluent is sent to headworks of plant 20C. In other embodiments, pump 36 and cyclone separator 38 are not used, and treated effluent from struvite reactor 32 is returned to the headworks or another location in plant 20C.

In FIGS. 4A-4D, embodiments are shown in which air stripper 26 and heat exchanger 28 are combined into a single unit, air stripper/heat exchanger 42 (which includes chamber 27A, coarse bubble air diffuser 27B, air pump or blower 27C), and sleeve or jacket 27D). FIGS. 4A-4D show plants 20D-20G, respectively.

Figure 4A:
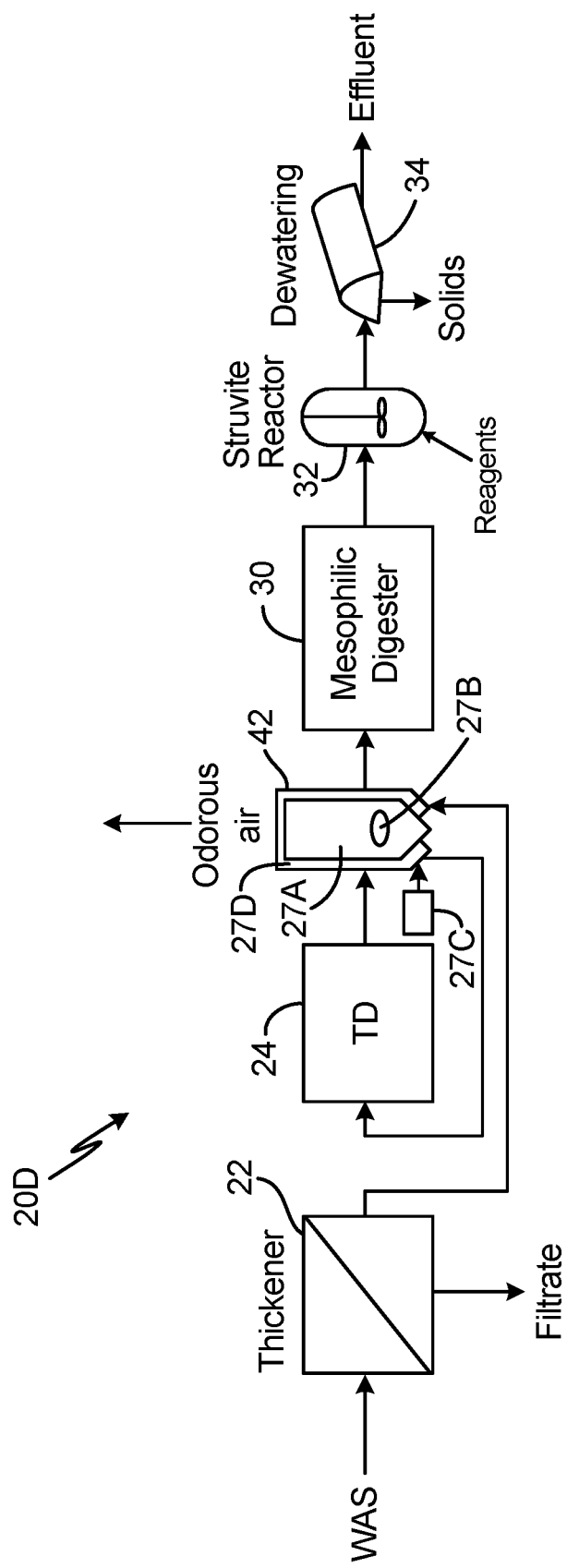
FIGS. 4A-4D are schematic block diagrams illustrating fourth, fifth, sixth, and seventh embodiments, respectively.

In FIG. 4A, WAS is supplied to thickener device 22. Filtrate from thickener device 22 is supplied to the head of plant 20D, while thickened WAS is fed to air stripper/heat exchanger 42. Heated thickened WAS is supplied to thermophilic digester (TD) 24. Thermophilic digestate from TD 24 is fed through air stripper/heat exchanger 42 to mesophilic digester 30. Mesophilic digestate from mesophilic digester 30 is supplied to struvite reactor 32. The output of reactor 32 is separated by dewatering apparatus 34 into biosolids enriched with struvite and effluent.

Figure 4B:
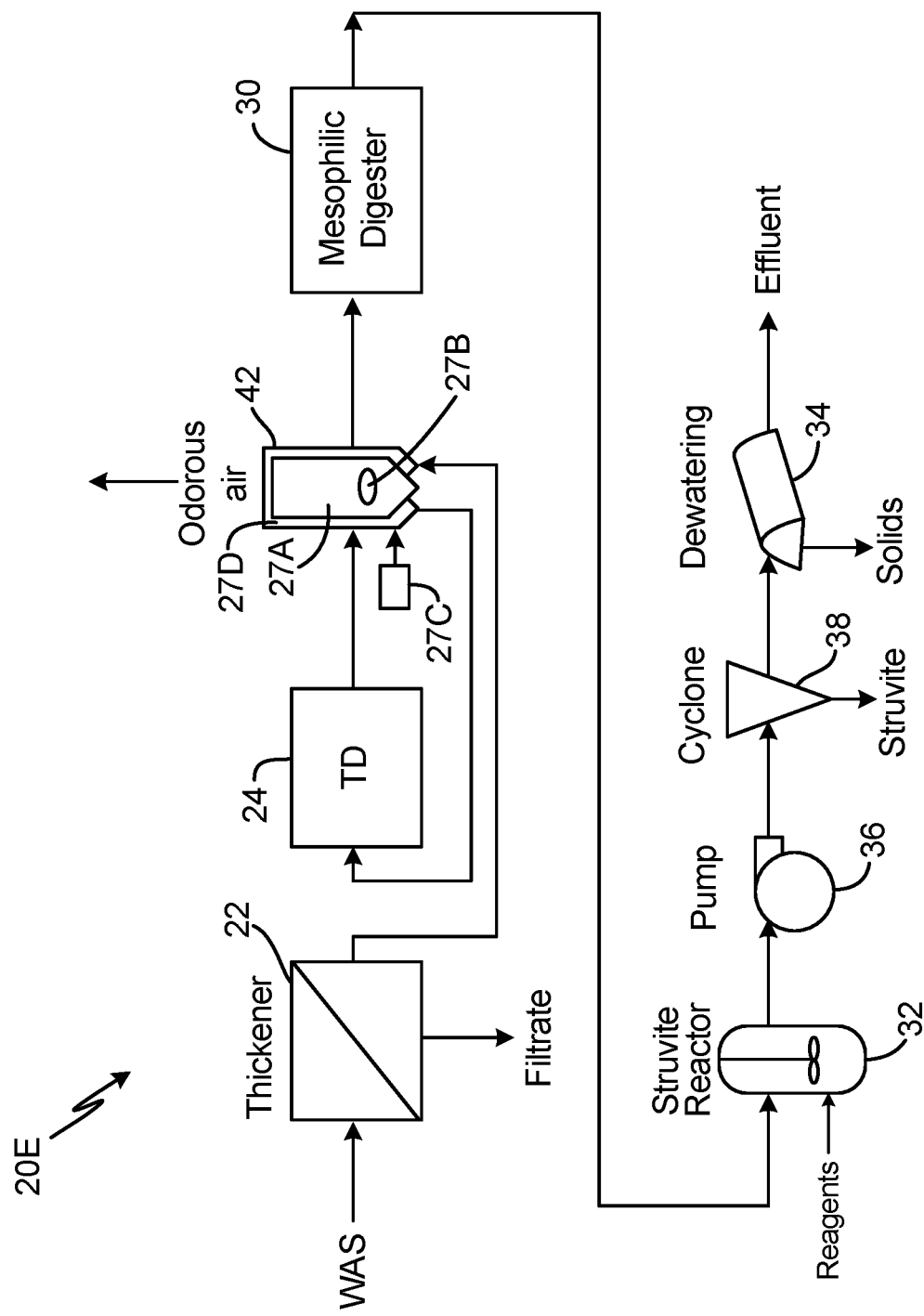

FIG. 4B shows plant 20E, which includes thickener device 22, thermophilic digester 24, mesophilic digester 30, struvite reactor 32, dewatering device 34, pump 36, cyclone separator 38, and air stripper/heat exchanger 42. Plant 20E is similar to plant 20D of FIG. 4A, except for the addition of pump 36 and cyclone separator 38 between struvite reactor 32 and dewatering device 34.

Figure 4C:
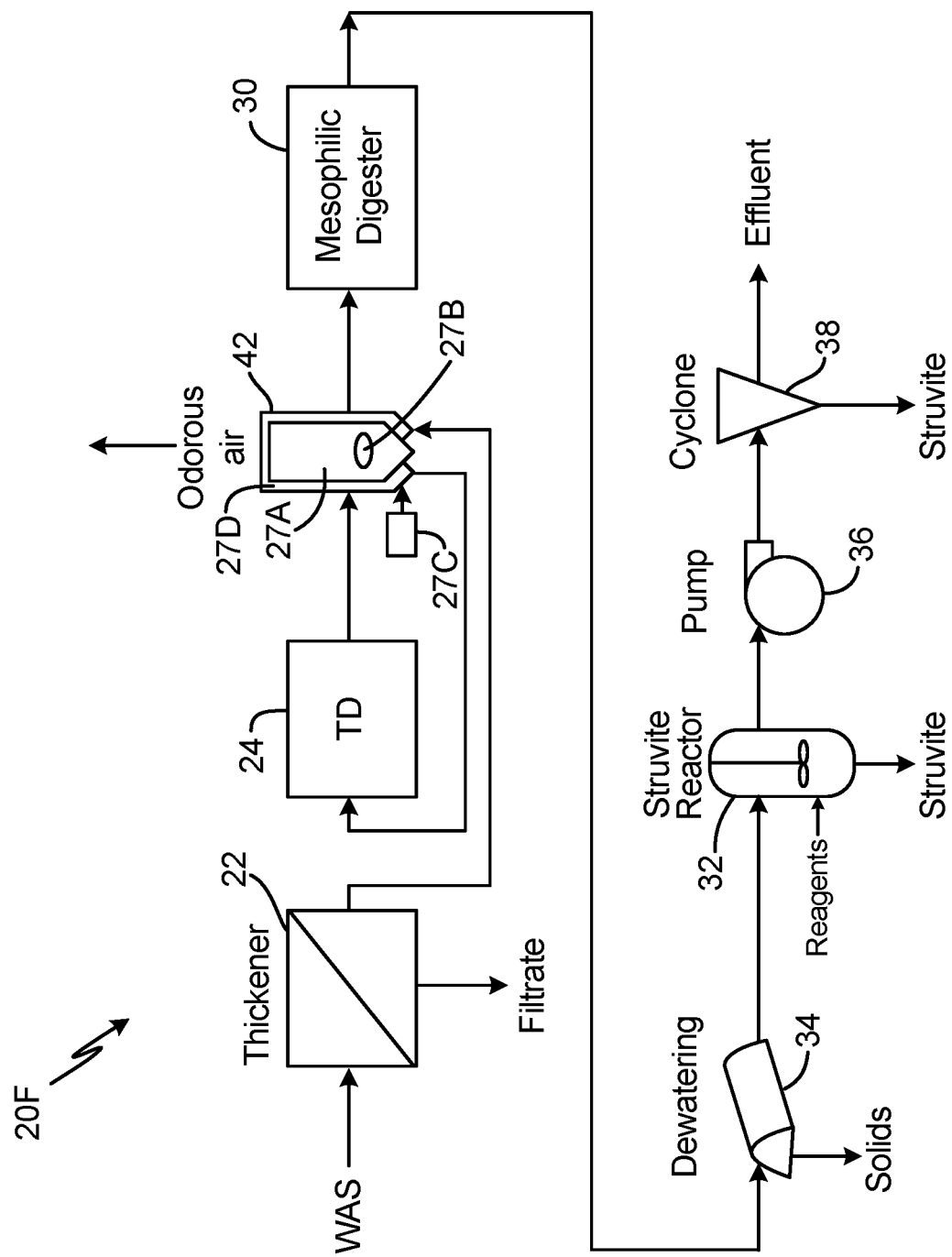

FIG. 4C shows plant 20F, which is generally similar to the embodiments of FIGS. 4A and 4B. Plant 20F includes thickener device 22, thermophilic digester 24, mesophilic digester 30, struvite reactor 32, dewatering apparatus 34, pump 36, cyclone separator 38, and air stripper/heat exchanger 42. In this embodiment, dewatering apparatus 34 is located between mesophilic digester 30 and struvite reactor 32. Pump 36 and cyclone separator 38 are downstream of struvite reactor 32.

Figure 4D:
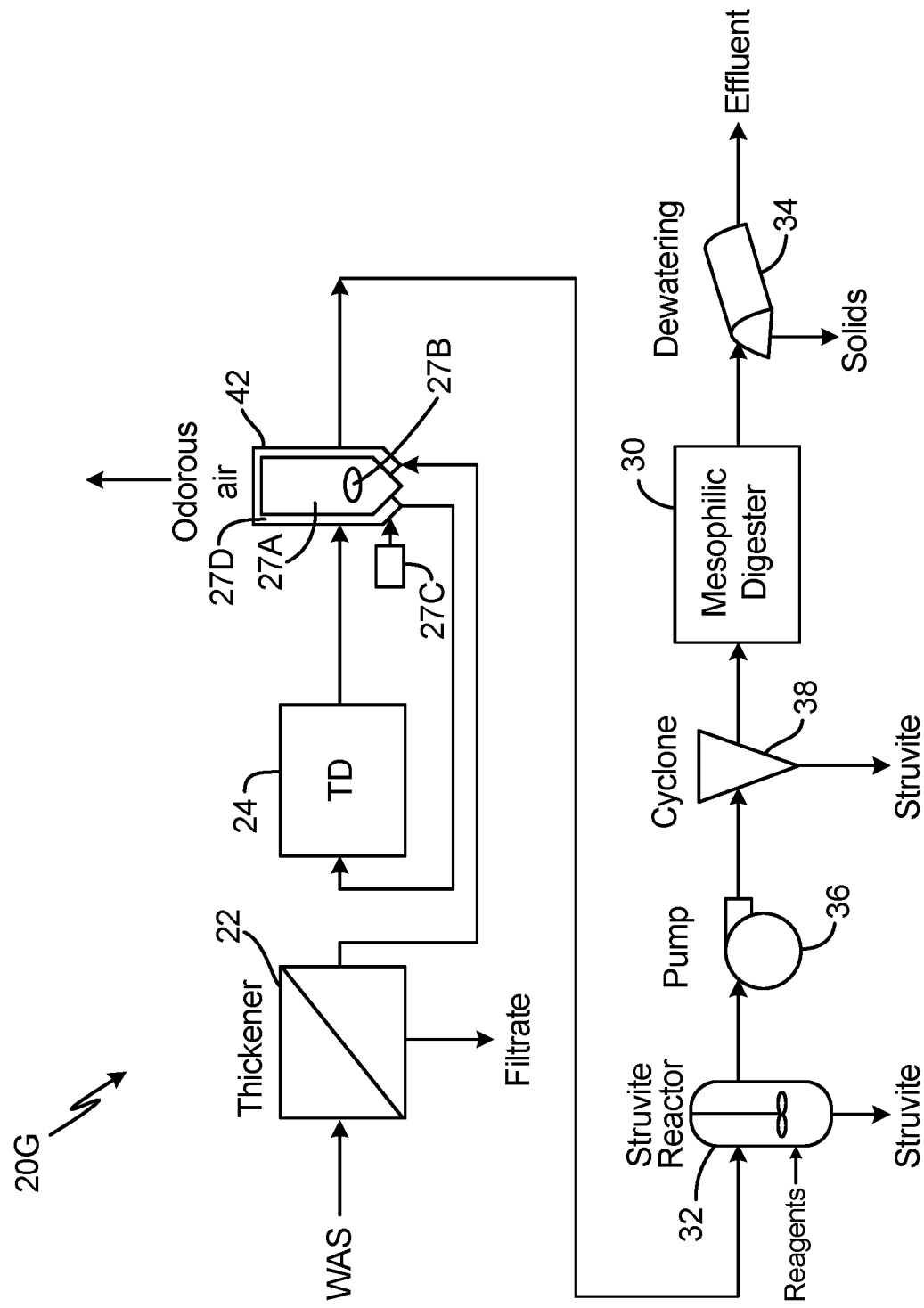

FIG. 4D shows plant 20G, which includes thickener device 22, thermophilic digester 24, mesophilic digester 30, struvite reactor 32, dewatering apparatus 34, pump 36, cyclone separator 38, and air stripper/heat exchanger 42. In this embodiment, both air stripper and struvite reactor 32 are located upstream of mesophilic digester 30. In this case it is also preferred to also include pump 36 and cyclone separator 38 upstream of mesophilic digester 30, because otherwise the struvite formed through the process would settle and accumulate in mesophilic digester 30. In this configuration, even with this harvesting, accumulations of settled struvite in mesophilic digester 30 are expected. Plant 20G would have to plan for periodic dredging of mesophilic digester 30 to clean out these settled solids. Harvesting at this point in the process will at best recover 50% of the struvite that is precipitated, leaving the balance to settle in the mesophilic digester if it is not well-mixed. In reality it can be anticipated that there will be dead zones where it is inevitable there will be accumulations. This dredging, while a nuisance for the plant, may be preferred over the other equipment and piping scaling issues that would be encountered otherwise. In this configuration, the air stripper could be configured as either an air stripper/heat exchanger 42 as in FIGS. 4A-4D, or could be air stripper 24 followed by heat exchanger 28 as in FIGS. 2A-3. It would be preferred to have the struvite reactor after the heat exchanger as solubility is lower at lower temperatures and the reaction would be more effective/efficient at the mesophilic temperature level than thermophilic temperatures.

FIGS. 2A-4C show "Reagents" being added to struvite reactor 32. Reagents would be added to the struvite reactor in most embodiments (extremely rare case there would not be any). The reagents discussed above are only the reagents commonly considered. Others can be used depending on the water chemistry. For most applications the process will be deficient in magnesium, so magnesium chloride or magnesium hydroxide are logical sources to introduce more for the reaction to continue. Additionally, the incoming liquid stream may require additional pH or buffering capacity, which would lead towards use of sodium hydroxide (NaOH) or magnesium hydroxide. But these selections are all to get the proper water chemistry. It can be envisioned that other reagents are more suitable in other applications. For example, in a system where there is sufficient magnesium, but the process stream is lacking both ammonia (nitrogen source) and in buffering capacity, an appropriate reagent is ammonium hydroxide. So the reagent selection will be based on characteristics of the incoming flow and there won't be a one-size-fits-all reagent.

In the schematics shown in FIGS. 2A-4D, the incoming sludge is acting as the cooling medium in the heat exchanger to both cool the outbound thermophilic sludge and also pre-heat that inbound sludge. From a thermal efficiency standpoint, this is preferred. But, you could use anything else as the cooling medium and just send the inbound sludge directly into the thermophilic digester without any pre-heating. This would just mean that the plant would need additional heat (natural gas most likely) to supplement the thermophilic digester to keep it at the correct temperature and just increase the operating expense a bit.

In still other embodiments, air stripper 26 and heat exchanger 28 can be multiple units in parallel to optimize air pump operations. Similarly, air stripper/heat exchanger 42 can be multiple units in parallel.

In those embodiments in which thermophilic digester 24 is acid-phase, air stripper 26 can be located after heat exchanger 28.

Instead of increasing pH by carbon dioxide removal, a reagent can be added to the thermophilic digestate upstream of the heat exchanger to increase pH.

The invention claimed is:

1. A waste treatment process comprising:
   supplying waste activated sludge to a thermophilic digester;
   processing the waste activated sludge in a thermophilic digester to produce a thermophilic digestate;
   increasing pH of the thermophilic digestate downstream of the thermophilic digester;
   concurrently with increasing pH of the thermophilic digestate and prior to any other processing, cooling the thermophilic digestate in a heat exchanger/air stripper;
   wherein increasing pH of the thermophilic digestate downstream of the thermophilic digester inhibits struvite scaling during cooling the thermophilic digestate in the heat exchanger; and
   separating struvite from the treated digestate.

2. The waste treatment process of claim 1, and further comprising:
   supplying the waste activated sludge through the heat exchanger to heat the waste activated sludge by heat transfer from the thermophilic digestate to the waste activated sludge before supplying the waste activated sludge to the thermophilic digester;
   processing the pH increased and cooled thermophilic digestate in a mesophilic digester to produce a mesophilic digestate downstream of the heat exchanger;
   wherein increasing pH of the thermophilic digestate downstream of the thermophilic digester inhibits struvite scaling during processing the pH increased and cooled thermophilic digestate in the mesophilic digester; and
   producing, with a struvite reactor, a treated digestate containing struvite.

3. The waste treatment process of claim 2, wherein processing the pH increased and cooled thermophilic digestate in a mesophilic digester to produce a mesophilic digestate occurs before any other processing.

4. The waste treatment process of claim 2, and further comprising:
   thickening the waste activated sludge by removing filtrate prior to supplying the waste activated sludge through the heat exchanger to the thermophilic digester.

5. The waste treatment process of claim 4, wherein the filtrate is supplied to the struvite reactor.

6. The waste treatment process of claim 5, and further comprising:
   dewatering the mesophilic digestate prior to supplying a mesophilic effluent to the struvite reactor.

7. The waste treatment process of claim 6, wherein separating struvite comprises:
   settling struvite in the struvite reactor; and
   dewatering treated digestate from the struvite reactor to separate effluent and biosolids enriched with struvite.

8. The waste treatment process of claim 2, wherein separating struvite comprises:
   separating, with a cyclone separator supplied by a pump, additional struvite fines remaining suspended in treated effluent from the struvite reactor.

9. The waste treatment process of claim 2, wherein separating struvite further comprises:
   separating, with a cyclone separator supplied by a pump between the struvite reactor and the cyclone separator, struvite from the treated digestate prior to dewatering.

10. The waste treatment process of claim 1, wherein increasing the pH comprises:
    removing carbon dioxide from the thermophilic digestate.

11. The waste treatment process of claim 10, wherein removing carbon dioxide from the thermophilic digestate comprises:
    supplying air to a coarse bubble air diffuser; and
    passing air bubbles through the thermophilic digestate.

12. The waste treatment process of claim 1, wherein increasing pH of the thermophilic digestate comprises:
    adding a reagent to the thermophilic digestate to increase pH.

13. The waste treatment process of claim 1, and further comprising:
   forming struvite in the air stripper/heat exchanger to reduce a limiting element of struvite formation from the thermophilic digestate, thereby reducing struvite scaling on downstream equipment.

14. A waste treatment system comprising:
   a thermophilic digester that produces a thermophilic digestate from waste activated sludge;
   an air stripper/heat exchanger, downstream of the thermophilic digester, that is fed a thermophilic digestate from the thermophilic digester which concurrently removes carbon dioxide from the thermophilic digestate to increase pH of the thermophilic digestate to reduce struvite scaling on downstream equipment and cools the thermophilic digestate by heat transfer from thermophilic digester to the waste activated sludge;
   a mesophilic digester, downstream of the air stripper/heat exchanger, that produces a mesophilic digestate from pH increased and cooled thermophilic digestate; and
   a struvite reactor that produces a treated digestate containing struvite from digested waste activated sludge.

15. The waste treatment system of claim 14, wherein the air stripper/heat exchanger includes a chamber, a coarse bubble air diffuser, an air pump or blower, and a sleeve or jacket.

16. A waste treatment process comprising:
   supplying waste activated sludge through a heat exchanger to a thermophilic digester;
   processing the waste activated sludge received from the heat exchanger in a thermophilic digester to produce a thermophilic digestate;
   increasing pH of the thermophilic digestate downstream of the thermophilic digester prior to any other processing;
   forming struvite concurrently with increasing pH of the thermophilic digestate to reduce a limiting element of struvite formation from the thermophilic digestate and to reduce struvite scaling on downstream equipment;
   subsequent to increasing pH of the thermophilic digestate and prior to any other processing, cooling the thermophilic digestate in the heat exchanger by heat transfer from the thermophilic digestate to the waste activated sludge;
   producing, with a struvite reactor, a treated digestate containing struvite; and
   separating struvite from the treated digestate.

17. The waste treatment process of claim 16, and further comprising:
   processing the pH increased and cooled thermophilic digestate in a mesophilic digester downstream of the heat exchanger to produce a mesophilic digestate.

18. The waste treatment process of claim 17, and further comprising:
   thickening the waste activated sludge by removing filtrate prior to supplying the waste activated sludge through the heat exchanger to the thermophilic digester, wherein the filtrate is supplied to the struvite reactor.

19. The waste treatment process of claim 16, wherein separating struvite comprises:
   dewatering treated digestate from the struvite reactor to separate effluent and biosolids enriched with struvite;
   separating struvite with a cyclone separator supplied by a pump from the treated digestate prior to dewatering; and
   separating, with a cyclone separator supplied by a pump, struvite fines suspended in treated effluent from the struvite reactor.

20. The waste treatment process of claim 16, wherein increasing the pH comprises:
   removing carbon dioxide from the thermophilic digestate.

* * * * *